United States Patent [19]

Knight

[11] 4,236,640

[45] Dec. 2, 1980

[54] SEPARATION OF NAHCOLITE FROM OIL SHALE BY INFRARED SORTING

[75] Inventor: John H. Knight, Aurora, Colo.

[73] Assignee: The Superior Oil Company, Houston, Tex.

[21] Appl. No.: 971,647

[22] Filed: Dec. 21, 1978

[51] Int. Cl.³ .................. B07C 5/342; C01D 7/22; C10G 32/02

[52] U.S. Cl. .................. 209/587; 208/12; 250/362; 250/365; 250/459; 423/206 R; 423/422; 209/577; 209/582; 209/588

[58] Field of Search .................. 209/3, 3.1, 3.2, 44.1, 209/576, 577, 578, 580, 581, 582, 587, 588; 250/253, 301, 361 R, 362, 365, 458, 459, 461 R; 356/70; 208/11 R, 12; 423/206 R, 421, 422

[56] References Cited

U.S. PATENT DOCUMENTS

| | | | |
|---|---|---|---|
| 2,401,410 | 6/1946 | Brown | 250/459 |
| 2,648,010 | 8/1953 | Smith | 250/301 X |
| 2,696,297 | 12/1954 | Matthews, Jr. | 209/581 |
| 3,053,497 | 9/1962 | Fraenkel . | |
| 3,066,797 | 12/1962 | Fraenkel . | |
| 3,097,744 | 7/1963 | Hutter et al. . | |
| 3,197,647 | 7/1965 | Fraenkel | 209/588 X |
| 3,356,211 | 12/1967 | Mathews | 209/3.1 |
| 3,655,964 | 4/1972 | Slight | 250/362 X |
| 3,762,546 | 10/1973 | Keitel et al. | 209/582 |
| 3,783,284 | 1/1974 | McCormack | 250/301 X |
| 3,962,403 | 6/1976 | Wyslouzil . | |
| 3,980,181 | 9/1976 | Hoover et al. . | |
| 3,992,287 | 11/1976 | Rhys . | |
| 4,088,227 | 5/1978 | Lockett . | |

FOREIGN PATENT DOCUMENTS

| | | | |
|---|---|---|---|
| 275970 | 1/1929 | United Kingdom | 209/576 |
| 1393061 | 5/1975 | United Kingdom | 209/587 |

OTHER PUBLICATIONS

IBM Technical Disclosure Bulletin, vol. 2, No. 5, Feb., 1960, Lyons, Silvey and Turner, pp. 97 and 98.

Primary Examiner—Robert J. Spar
Assistant Examiner—Edward M. Wacyra
Attorney, Agent, or Firm—Arnold, White & Durkee

[57] ABSTRACT

Nahcolite-containing ore particles are separated from oil shale particles in a mixture of particles of nahcolite-bearing oil shale ore by irradiating the mixture of ore particles with electromagnetic energy in the infrared region of the spectrum and sorting the particles according to energy reflected at one or more selected wavelengths within that region to separate the nahcolite-containing ore particles from the oil shale particles.

10 Claims, 3 Drawing Figures

4,236,640

SEPARATION OF NAHCOLITE FROM OIL SHALE BY INFRARED SORTING

BACKGROUND OF THE INVENTION

This invention relates to the separation of minerals from ore, and, more particularly, to the separation of nahcolite-containing ore particles from oil shale particles in a mixture of particles of nahcolite-bearing oil shale ore.

Large deposits of oil-bearing shale have been discovered in this and other countries, but have remained relatively untapped for want of an economic process for recovery of the oil at a cost comparable to conventional oil sources. The increasing cost of liquid petroleum, however, has sharpened interest in producing oil from oil shale deposits. Some of these oil shale deposits also contain substantial quantities of other valuable minerals, recovery of which will help to make the economics of the oil recovery more attractive.

One of the minerals found in substantial quantities in some oil shale deposits is nahcolite, a naturally occurring sodium bicarbonate, which has been found useful in reducing the sulphur and nitrogen content of hydrocarbons and flue gas. Efficient separation of this nahcolite from the remaining mined oil shale ore will greatly enhance prospects for possible recovery of oil and other minerals from such deposits.

As used herein, the term "nahcolite" refers to the naturally occurring sodium bicarbonate found in oil shale deposits. "Oil shale ore" refers to nahcolite-bearing oil shale which includes nahcolite-containing ore particles and oil shale particles, and "oil shale" refers to the residue which remains after the nahcolite-containing particles have been removed from the oil shale ore.

Processes for separating nahcolite from oil shale are disclosed in U.S. Pat. Nos. 3,962,403 to Wyslousil and 3,992,287 to Rhys. In each of these processes, the mined oil shale ore is subjected to one or more treatment steps to produce a surface color change, thereby enabling optical sorting of the nahcolite from the host oil shale. In U.S. Pat. No. 3,962,403, the color change is accomplished by heating the ore by direct or indirect heat to convert at least some of the surface bicarbonate to a lighter colored carbonate, while the process of U.S. Pat. No. 3,992,287 involves spraying water on the surface of the ore to produce a wetted film of bicarbonate solution which is then subjected to microwave drying to produce a surface film of bicarbonate crystals having a lighter color than the host oil shale. The cost of producing such a color change in the nahcolite-containing portion of the mined oil shale ore, however, represents a significant portion of the overall cost of the nahcolite recovery operation. It is therefore desirable to separate the nahcolite-containing ore particles from the host oil shale particles without the expense of producing the surface color change heretofore required.

SUMMARY OF THE INVENTION

According to the present invention, nahcolite-containing ore particles are separated from oil shale particles in a mixture of nahcolite-bearing oil shale ore by a process in which the oil shale ore is irradiated with infrared electromagnetic energy, the intensity of the energy reflected from the particles at one or more selected wavelengths in the infrared region is sensed, and the particles are then sorted according to the sensed reflected energy to separate the nahcolite-containing ore particles from the oil shale particles.

In one application of the present invention, mined nahcolite-bearing oil shale ore is crushed to produce a mixture of particles of nahcolite or nahcolite-containing ore and oil shale, the particles having a size of between about three-fourths inch and eight inches of convenience in handling. The ore particles are then conveyed to electromechanical sorting apparatus wherein they are irradiated with electromagnetic energy in the infrared region, the electromagnetic energy reflected from the particles at one or more preselected wavelengths in the region between about 1.0 and about 2.4 microns is sensed, and the particles are sorted according to the sensed energy to separate the nahcolite and nahcolite-containing ore particles from the oil shale particles.

BRIEF DESCRIPTION OF THE DRAWINGS

The invention will now be described with reference to the accompanying drawings wherein.

DESCRIPTION OF THE PREFERRED EMBODIMENT

Figure 1:
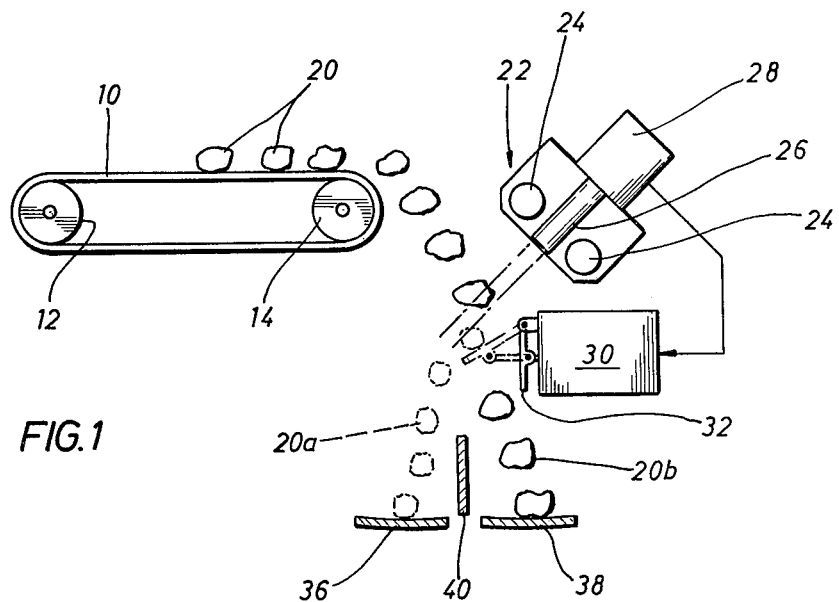
FIG. 1 illustrates schematically the separation of nahcolite-containing ore particles from oil shale particles by infrared sorting.

Referring now to FIG. 1 of the drawings, mined nahcolite-bearing oil shale ore particles containing nahcolite and oil shale are deposited on a continuous belt 10 for presentation to sorting apparatus. The nahcolite-bearing oil shale ore comes from the mine a gray-brown color. Although the nahcolite itself may appear somewhat shinier than the remainder of the oil shale ore, it has the same basic color as the remainder of the ore. The mined ore first is crushed to produce particles of less than about eight inches in maximum dimension, preferably between about eight inches and about three-quarters of an inch in size, by conventional crushing techniques. It has been found that a portion of the nahcolite may be separated from the oil shale ore on the basis of particle size difference when the initial step is carried out by impact crushing under controlled conditions. Such crushing of the mined nahcolite-bearing oil shale ore results in a fine fraction in the size range below three-quarters of an inch composed predominantly of nahcolite and a coarse fraction composed of the tougher oil shale particles and larger particles of liberated nahcolite ore containing a substantial portion of nahcolite. The present invention is directed towards separation of this coarse fraction into a fraction which is predominantly nahcolite and a fraction which is predominantly oil shale.

As the oil shale ore particles are passed from the end of conveyor belt 10, they fall freely past an inspection device 22 where they are irradiated by infrared energy by radiation sources 24. The reflected energy is sensed by a viewer or sensor 26, which is aligned to view the ore particles while they are being subjected to the infrared radiation. It will be apparent that, if the particles continue on their trajectory path undisturbed, they will fall onto conveyor 38. In order to sort the particles, an ejector 30 is positioned beneath the inspection device 22, and includes a paddle or deflector 32, such as is disclosed in U.S. Pat. No. 3,980,181 to Hoover et al. Alternatively, the ejector may be an air ejector of a type such as that disclosed in U.S. Pat. No. 3,053,497 to Fraenkel or U.S. Pat. No. 3,097,744 to Hutler et al. The ejector 30 is electronically coupled to the inspection assembly 22 through a decision circuit 28.

If the particles reflect more or less than a predetermined amount of electromagnetic energy at the selected wavelength or wavelengths, as sensed by the sensor 26, the decision circuit 28 generates and applies an electrical pulse to the ejector 30, which in turn acts to deflect the particle from its normal trajectory such that it will fall on conveyor belt 36. The actuation of the paddle 32, or, alternatively, of the blast of air, is timed so that the particle is positioned adjacent the ejector when the ejection occurs. A divider or partition 40 separates the conveyors 36, 38 from one another. It will be appreciated that apparatus for effecting this separation may be set up to eject either the oil shale or the nahcolite-containing ore particles, as may be desired. It is preferred, however, that the apparatus be set up to eject the particles present in lesser proportion, so as to minimize wear and costs associated in the ejector mechanism. When the sorting apparatus is so operated, the free fall of the majority of the particles will continue unimpeded to the conveyor belt 38.

Although the invention has been described with reference to a single path feed of nahcolite-bearing oil shale ore particles in free fall past an inspection device, it will be appreciated that the sorting of such particles may be carried out as the particles are passed before an inspection device on the feed belt, and, in particular, a large quantity of such particles may be sorted on or as they fall from a wide belt with a plurality of side by side inspection devices in the manner suggested by U.S. Pat. Nos. 3,980,181 to Hoover et al and 4,088,227 to Lockett.

The present invention will be further illustrated with reference to the following examples.

Figure 2:
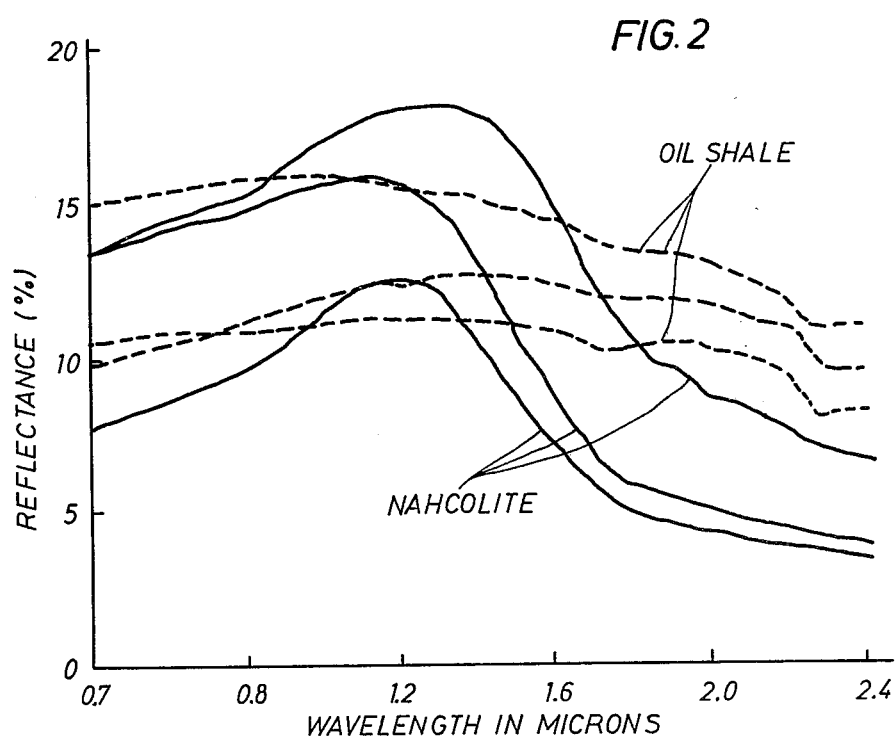
FIG. 2 illustrates the reflectance of nahcolite and oil shale to infrared energy for wavelengths between about 0.7 and about 2.4 microns.

Infrared scans were run on samples of nahcolite and oil shale particles to determine to reflectance of the particles as a function of wavelength of electromagnetic radiation. The percent reflectance of each of these samples with respect to wavelength between about 0.7 and 2.4 microns is illustrated in FIG. 2. This test was carried out with a Beckman infrared reflecting spectrophotometer, as manufactured by Beckman Instruments, Inc., of Fullerton, Calif.

Figure 3:
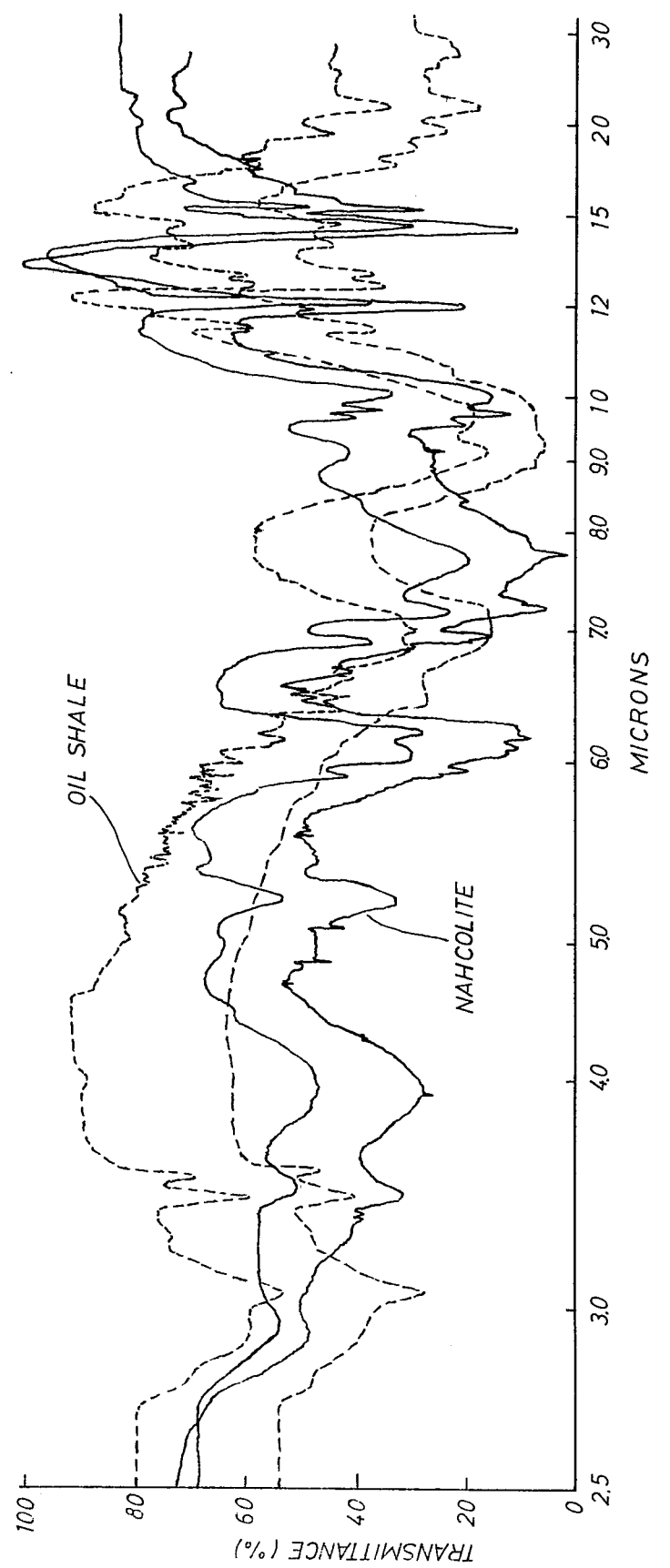
FIG. 3 illustrates the transmittance of nahcolite and oil shale to infrared energy for wavelengths between about 2.5 and about 40 microns.

Infrared scans also were run on samples of nahcolite and oil shale to determine the transmittance of each as a function of wavelength of electromagnetic radiation between 2.5 and 40 microns. It will be appreciated that in determining transmittance the radiation source and the sensor are located on opposite sides of the sample, and that the apparatus disclosed above may readily be adapted to such an arrangement. The percent transmittance of each of these samples with respect to wavelength is illustrated in FIG. 3. These measurements were made with a Perkin-Elmer model 521 infrared spectrophotometer, as manufactured by Perkin-Elmer Corp. of Norwalk, Conn.

It will be appreciated that limitations in the present state of the art of sensor technology, and in particular the sensitivity and response time of the sensors, at wavelengths greater than about four microns, may be sufficiently overcome in the near future to enable practical, large scale ore sorting operations at the longer wavelengths. In the meantime the best mode contemplated for sorting according to the present invention is to use conventional lead sulfide sensors in a bichromatic arrangement and to measure the ratio of the respective reflectances at about 1.3 and 2.0 microns. The ejector may then be programmed for activation to eject those particles where the ratio exceeds, for example, 2.0. Of course, as may be seen from FIG. 3, infrared sorting of nahcolite and oil shale may be carried out at one or more of the longer wavelengths, if desired.

The present invention provides a method for separation of nahcolite-containing ore particles from oil shale particles without the necessity of wetting or heating the particles in the process, and thereby results in substantial economies in the separation process. It will be readily appreciated that ore particles of various sizes may be processed in accordance herewith by suitable selection of ejector apparatus, and it is to be understood that reasonable variation and modifications may be made in the carrying out of this invention within the scope of the appended claims.

What is claimed is:

1. A process for separating nahcolite-containing ore particles from oil shale particles in a mixture of particles of nahcolite-bearing oil shale ore, comprising the steps of:
   irradiating the mixture of ore particles with infrared electromagnetic energy;
   sensing the intensity of the electromagnetic energy reflected from the particles at a selected wavelength between about 0.7 and about 40 microns; and
   sorting the particles responsive to the sensed reflected energy to separate the nahcolite-containing ore particles from the oil shale particles.

2. The process of claim 1 wherein said nahcolite-bearing oil shale ore is in the form of particles having a maximum dimension of from about three-fourths inch to about eight inches.

3. The process of claim 1 wherein the intensity of the reflected electromagnetic energy is sensed at a plurality of selected wavelengths, and the sorting of the particles is responsive to a function of the plurality of sensed intensities.

4. The process of claim 1 wherein the intensity of the electromagnetic energy reflected from the particles is sensed at a selected wavelength between about 2.5 and about 40 microns and the particles having the greater sensed reflected energy at the selected wavelength are sorted from the particles having the lesser sensed reflected energy at that wavelength to separate the nahcolite-containing particles from the oil shale particles.

5. The process of claim 1 wherein the intensity of the electromagnetic energy reflected from the particles is sensed at a plurality of selected wavelengths, the ratio of the intensities of the energy reflected at each of two selected wavelengths is determined, and the particles for which the ratio is greater are sorted from the particles for which the ratio is lesser to separate the nahcolite-containing particles from the oil shale particles.

6. The process of claim 5 wherein the selected wavelengths are between about 0.7 and about 2.4 microns.

7. The process of claim 5 wherein the ratio of the intensities of the energy reflected is determined for the wavelengths of about 1.3 and about 2.0 microns.

8. A process for separating nahcolite-containing ore particles from oil shale particles in a mixture of nahcolite-bearing oil shale ore particles having a greatest dimension of from about three-fourths inch to about eight inches, comprising the steps of:
  irradiating the mixture of oil shale ore particles with infrared electromagnetic energy in the wavelengths from about 0.7 to about 2.4 microns;
  sensing the intensity of the electromagnetic energy reflected from the particles at two selected wavelengths between 0.7 and 2.4 microns; and
  sorting the particles responsive to the ratio of the intensity of the energy reflected at one of the selected wavelengths with respect to the energy reflected at the other to separate the nahcolite-containing ore particles from the oil shale particles.

9. The process of claim 8, wherein the two selected wavelengths are about 1.3 and about 2.0 microns and the particles are sorted responsive to the ratio of the sensed infrared energy reflected at each of said wavelengths.

10. A process for separating nahcolite-containing ore particles from oil shale particles in a mixture of particles of nahcolite-bearing oil shale ore, comprising the steps of:
  irradiating the mixture of ore particles with infrared electromagnetic energy;
  sensing the intensity of the electromagnetic energy transmitted through the particles at a selected wavelength between about 0.7 and about 40 microns; and
  sorting the particles responsive to the sensed transmitted energy to separate the nahcolite-containing ore particles from the oil shale particles.

* * * * *